(12) United States Patent
Barker et al.

(10) Patent No.: US 8,746,589 B2
(45) Date of Patent: Jun. 10, 2014

(54) BOOM ASSEMBLY JOINTS

(75) Inventors: Mark E. Barker, Ankeny, IA (US);
Roger E. Daniels, Newton, IA (US);
Richard A. Humpal, Ankeny, IA (US)

(73) Assignee: Deere & Company, Moline, IL (US)

( * ) Notice: Subject to any disclaimer, the term of this patent is extended or adjusted under 35 U.S.C. 154(b) by 299 days.

(21) Appl. No.: 13/228,539

(22) Filed: Sep. 9, 2011

(65) Prior Publication Data

US 2013/0062432 A1    Mar. 14, 2013

(51) Int. Cl.
*B05B 1/20*    (2006.01)

(52) U.S. Cl.
USPC .......................................... 239/159; 239/163

(58) Field of Classification Search
CPC ........... B05B 1/20; B05B 3/12; A01G 25/092
USPC ......... 239/159, 166, 172, 722, 728, 730, 723, 239/164
See application file for complete search history.

(56) References Cited

U.S. PATENT DOCUMENTS

| | | | | |
|---|---|---|---|---|
| 5,954,270 A | * | 9/1999 | Rosset | 239/159 |
| 5,992,759 A | * | 11/1999 | Patterson | 239/167 |
| 6,042,020 A | * | 3/2000 | Weddle | 239/166 |
| 6,966,501 B2 | | 11/2005 | Wubben et al. | |
| 7,413,132 B1 | | 8/2008 | Bogart et al. | |
| 7,458,526 B2 | * | 12/2008 | Honermann et al. | 239/172 |

FOREIGN PATENT DOCUMENTS

| | | |
|---|---|---|
| DE | 19905207 | 2/1999 |
| DE | 10338380 A1 | 3/2005 |
| EP | 1302107 A1 | 4/2003 |
| EP | 1302107 | 12/2007 |
| FR | 2595205 | 9/1987 |
| FR | 2643831 | 9/1990 |
| GB | 240309 | 10/1925 |

OTHER PUBLICATIONS

European Search Report, dated Jan. 4, 2013 (6 pages).

* cited by examiner

*Primary Examiner* — Davis Hwu

(57) ABSTRACT

A boom structure for a mobile agricultural implement. The boom structure includes a first transversely extending beam member having a first protrusion. The boom structure includes a second transversely extending beam member having a second protrusion. The second transversely extending beam member is spatially offset from the first transversely extending beam member. A plurality of first coupling members are coupled to the first protrusion and a plurality of second coupling members coupled to the second protrusion. A plurality of connecting members are coupled to the first and second coupling members to connect the first and second transversely extending beam members.

9 Claims, 4 Drawing Sheets

BOOM ASSEMBLY JOINTS

FIELD OF THE DISCLOSURE

The present disclosure generally relates to mobile agricultural implements, and more particularly to boom assembly joints for mobile agricultural implements.

BACKGROUND OF THE DISCLOSURE

In order to dispense treatments, mobile agricultural implements commonly include a frame, at least one front wheel, a set of rear wheels, a tank for storing a treatment to be dispensed, and a pair of boom assemblies.

Each boom assembly typically includes a triangular or L-shaped configuration with the base triangle or the lower leg of the L-shaped configuration at the bottom of the boom. Alternatively, each boom assembly may include an inverted right triangle configuration with the base of the triangle at an uppermost portion of the boom as shown in commonly assigned U.S. Pat. No. 6,966,501.

SUMMARY OF THE DISCLOSURE

In one embodiment, a boom structure for a mobile agricultural implement includes a first transversely extending beam member having a first protrusion. The boom structure includes a second transversely extending beam member having a second protrusion. The second transversely extending beam member is spatially offset from (e.g., facing or generally parallel to) the first transversely extending beam member. A plurality of first coupling members are coupled to the first protrusion and a plurality of second coupling members coupled to the second protrusion. A plurality of connecting members are coupled to the first and second coupling members to connect the first and second transversely extending beam members.

Other features and aspects will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

DETAILED DESCRIPTION

Figure 1:
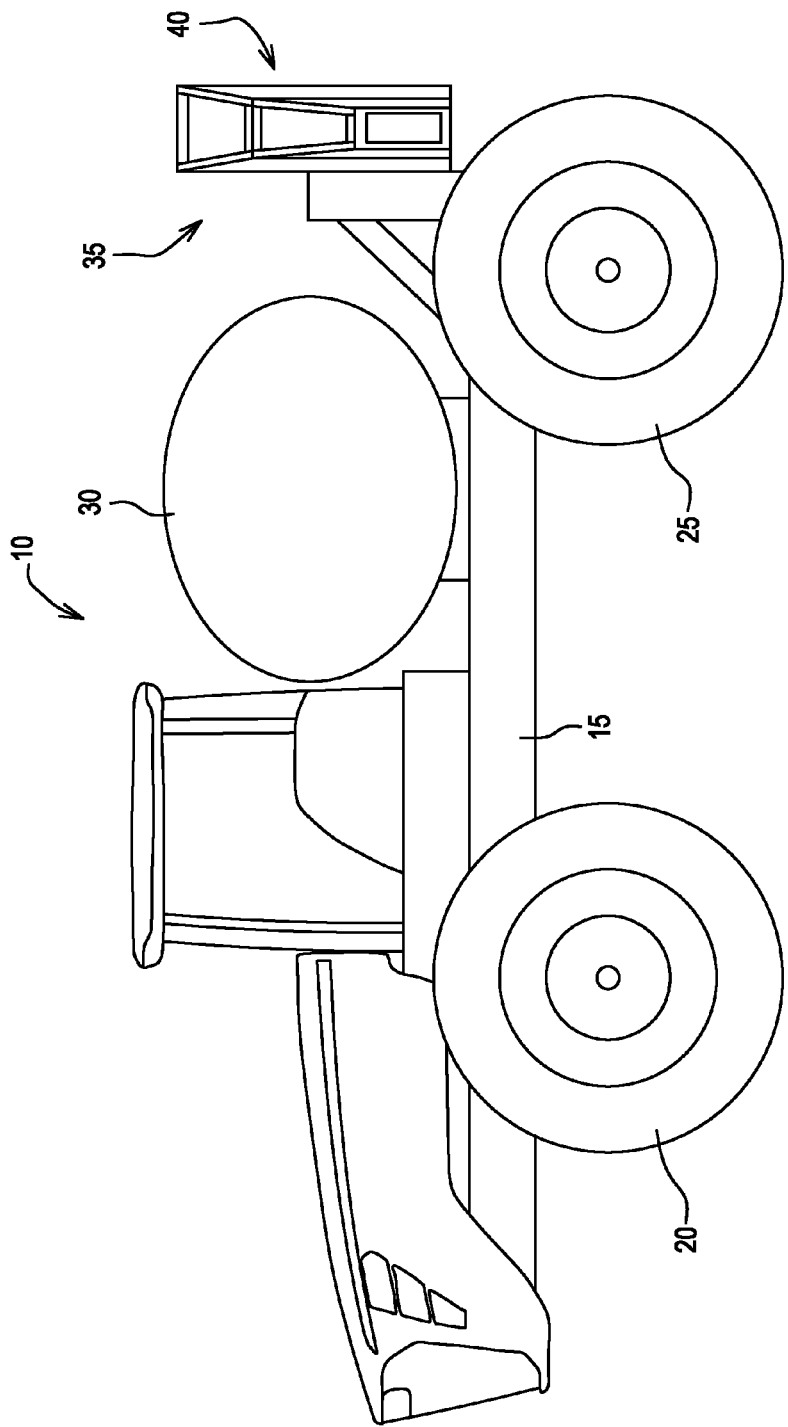
FIG. 1 is a perspective view of a mobile agricultural implement according to one embodiment of the disclosure.

FIG. 1 illustrates a mobile agricultural implement 10. The illustrated mobile agricultural implement 10 includes a frame 15, one or more front wheels 20, a set of rear wheels 25, a tank 30 for storing a treatment (e.g., chemical) to be dispensed, and a pair of boom assemblies 35 having a boom structure 40. Alternatively, the mobile agricultural implement 10 may be a pull-behind type device with no front wheel.

Figure 2:
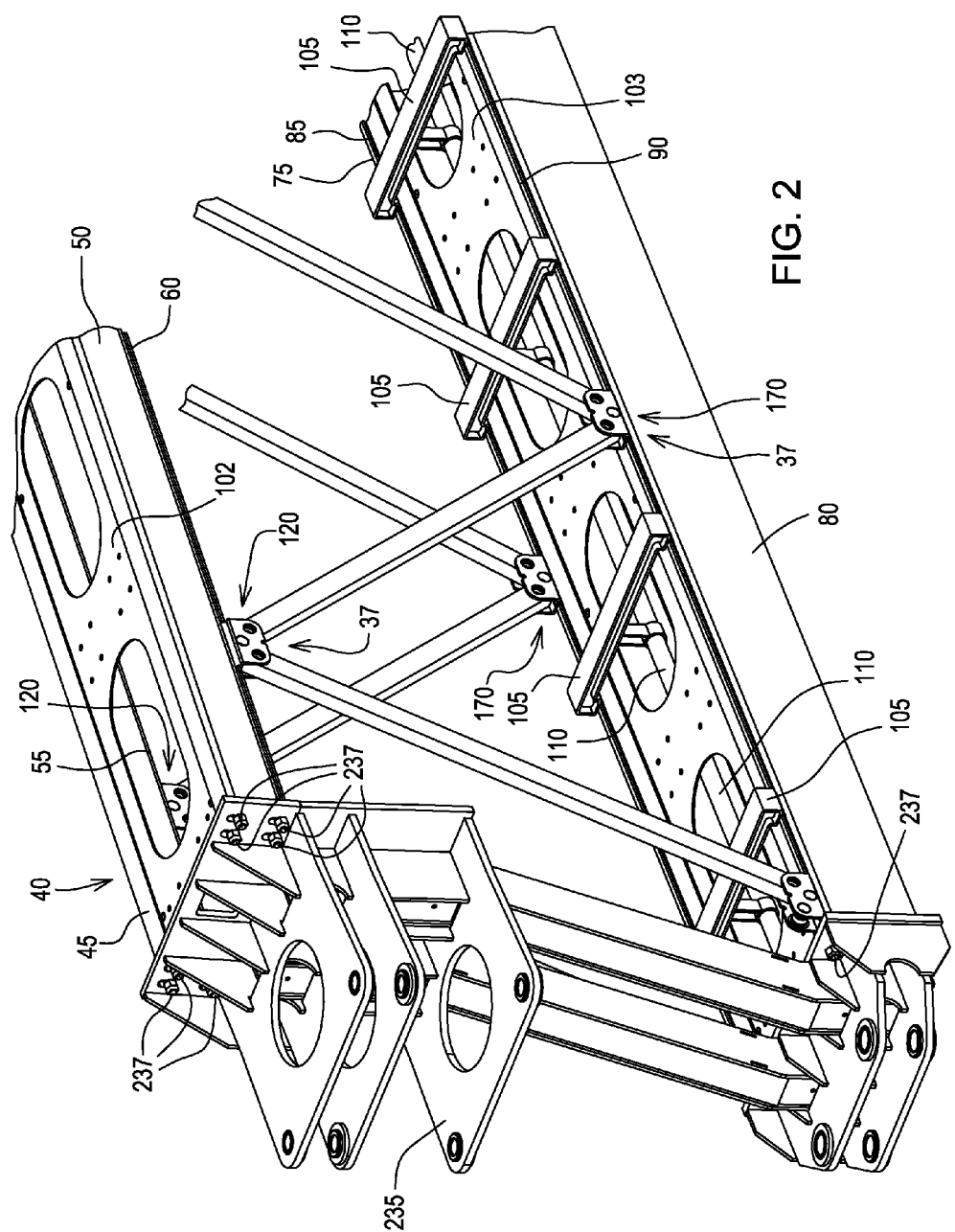
FIG. 2 is a perspective view of a portion of the mobile agricultural implement shown in FIG. 1, where the implement features boom assembly joints.

With reference to FIG. 2, the boom assembly 35 of the mobile agricultural implement 10 may be assembled with little or no welding. Little or no welding is possible because of weldless boom assembly joints 37, for example.

Figure 3:
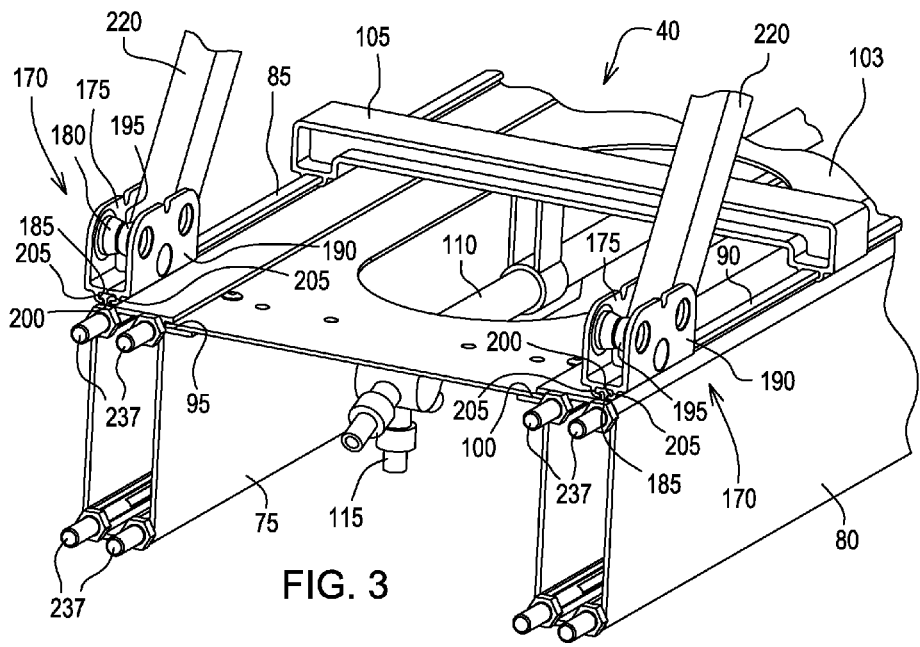
FIG. 3 is an enlarged partial perspective view of a portion of the mobile agricultural implement shown in FIG. 1.
Figure 4:
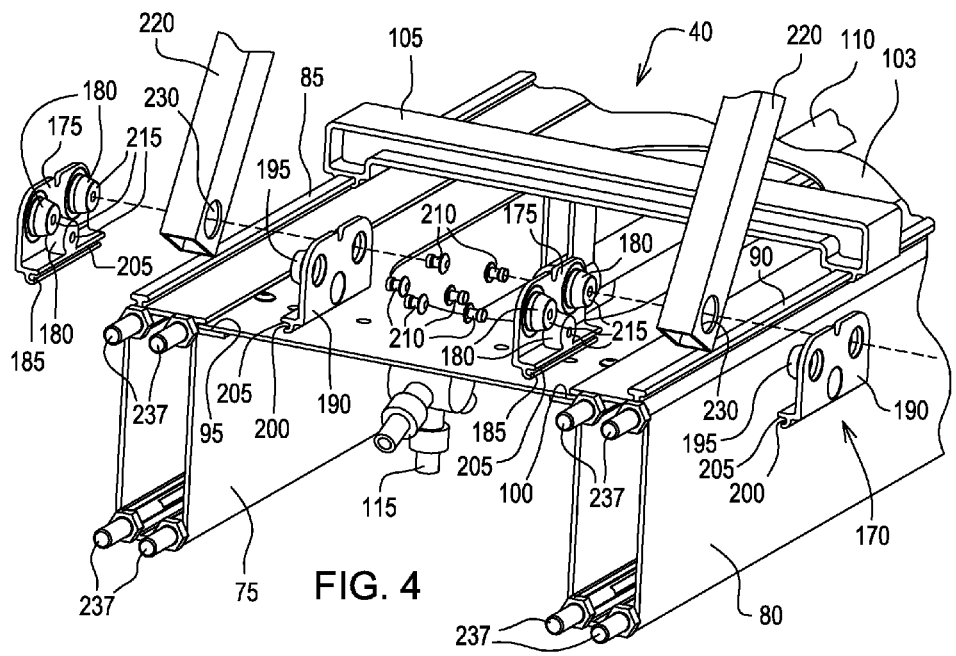
FIG. 4 is an exploded view of the mobile agricultural implement shown in FIG. 3.
Figure 5:
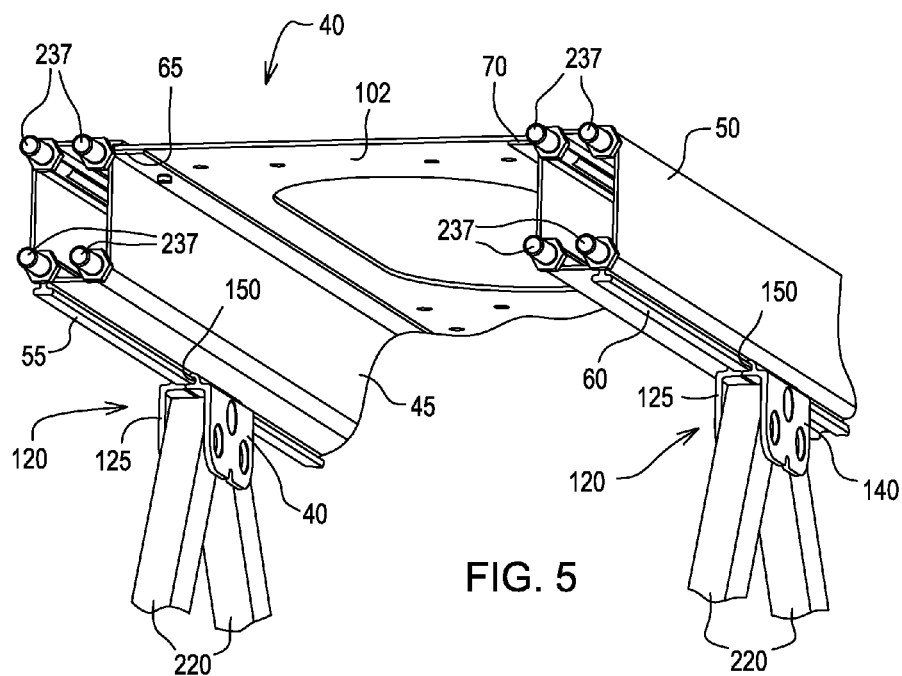
FIG. 5 is an enlarged partial perspective view of a portion of the mobile agricultural implement shown in FIG. 1.
Figure 6:
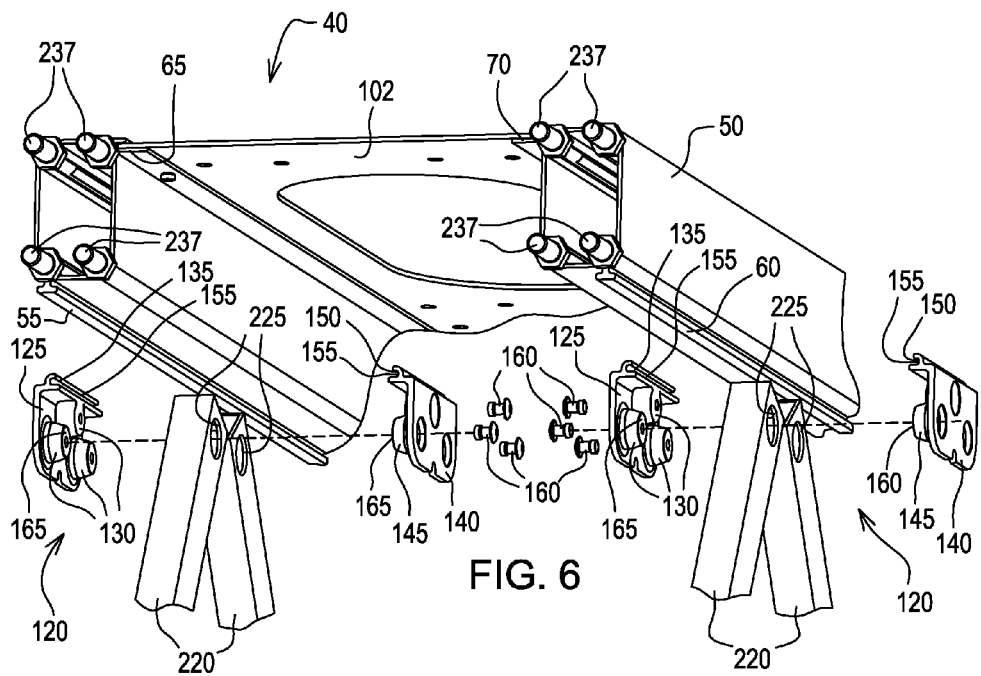
FIG. 6 is an exploded view of the mobile agricultural implement shown in FIG. 5.

Referring to FIGS. 2, 5, and 6 each boom structure 40 includes a first pair of left and right transversely extending beam members 45, 50 each having a first protrusion 55, 60 and a first sheet member receiving portion 65, 70 (FIG. 6). Referring to FIGS. 2-4, each boom structure 40 includes a second pair of left and right transversely extending beam members 75, 80 each having a second protrusion 85, 90 and a second sheet member receiving portion 95, 100 (FIGS. 3-4). Referring to FIG. 2, the second pair of left and right transversely extending beam members 75, 80 is spatially offset from (e.g., facing or generally parallel to) the first pair of left and right transversely extending beam members 45, 50.

The left first transversely extending beam member 45 may be generally parallel to the left second transversely extending beam member 75. The right first transversely extending beam member 50 may be generally parallel to the right second transversely extending beam member 80. The first and second pair of left and right transversely extending beam members (45, 50, 75, 80) may form a parallelogram. The first and second protrusions (55, 60, 85, 90) may be T-shaped, L-shaped, form a retention rail, or form other shapes suitable for mounting. The first and second pair of left and right transversely extending beam members (45, 50, 75, 80) may be fabricated from a metal, an alloy, aluminum, an aluminum alloy, or other light weight material including carbon fiber, composites, a polymer, a plastic, a filler in a resin matrix, or another suitable material. For example, 6061-T6 aluminum may be used, which provides some corrosion resistance.

A first sheet member 102 is received by the first sheet member receiving portions 65, 70 of the first pair of left and right transversely extending beam members 45, 50 and a second sheet member 103 is received by the second sheet member receiving portions 95, 100 of the second pair of left and right transversely extending beam members 75, 80. The first and second sheet members (102, 103) may be fabricated from a metal, an alloy, aluminum, an aluminum alloy, or other light weight material including carbon fiber, composites, a polymer, a plastic, a filler in a resin matrix, or another suitable material. Aluminum provides some corrosion resistance.

With continued reference to FIG. 2, a tube holder 105 is coupled to the second protrusions 85, 90 of the second pair of left and right transversely extending beam members 75, 80. A tube 110 is coupled to the tube holder 105. Referring to FIGS. 3 and 4, a nozzle 115 in fluid communication with the tube 110 is positioned between the second pair of left and right transversely extending beam members 75, 80. The nozzle 115 is positioned between the second pair of left and right transversely extending beam members 75, 80 to protect the nozzle 115. The tube holder 105 and tube 110 may be fabricated from a metal, an alloy, aluminum, an aluminum alloy, or other light weight material including carbon fiber, composites, a polymer, a plastic, a filler in a resin matrix, or another suitable material. Aluminum provides some corrosion resistance.

Referring to FIGS. 2, 5, and 6, each boom structure 40 includes a plurality of first coupling members 120 coupled to the first protrusion 55, 60 of each of the first pair of left and right transversely extending beam members 45, 50. Each first coupling member 120 has a first portion 125 with a first portion protrusion 130 and a first groove 135. The first coupling member 120 has a second portion 140 with a second portion protrusion 145 and a second groove 150. The first portion protrusion 130 and the second portion protrusion 145 are facingly engaged. The first portion protrusion 130 and the second portion protrusion 145 may be tapered. The first groove 135 and the second groove 150 receive one of the first protrusions 55, 60. An adhesive 155 may be applied to the first and second grooves 135, 150 to couple the first and second portions 125, 140 to one of the first protrusions 55, 60. A plurality of rivets 160 or adhesive 165 may be used to couple the first portion protrusion 130 of the first coupling member 120 to the second portion protrusion 145 of the first coupling member 120. One-quarter inch Alcoa Huck Magna-Lok® aluminum blind rivets may be used. The first coupling member 120 may be fabricated from a metal, an alloy, aluminum, an aluminum alloy, or other light weight material including carbon fiber, composites, a polymer, a plastic, a filler in a resin matrix, or another suitable material. Die-cast aluminum provides a low manufacturability cost.

With reference to FIGS. 2-4, each boom structure 40 includes a plurality of second coupling members 170 coupled to the second protrusion 85, 90 of each of the second pair of left and right transversely extending beam members 75, 80. Each second coupling member 170 has a first portion 175 with a first portion protrusion 180 and a first groove 185. The second coupling member 170 has a second portion 190 with a second portion protrusion 195 and a second groove 200. The first portion protrusion 180 and the second portion protrusion 195 are facingly engaged. The first portion protrusion 180 and the second portion protrusion 195 may be tapered. The first groove 185 and the second groove 200 receive one of the second protrusions 85, 90. An adhesive 205 may be applied to the first and second grooves 185, 200 to couple the first and second portions 175, 190 to one of the second protrusions 85, 90. A plurality of rivets 210 or adhesive 215 may be used to couple the first portion protrusion 180 of the second coupling member 170 to the second portion protrusion 195 of the second coupling member 170. One-quarter inch Alcoa Huck Magna-Lok® aluminum blind rivets may be used. The second coupling member 170 may be fabricated from a metal, an alloy, aluminum, an aluminum alloy, or other light weight material including carbon fiber, composites, a polymer, a plastic, a filler in a resin matrix, or another suitable material. Die-cast aluminum provides a low manufacturability cost.

Referring to FIGS. 2-6, each boom structure 40 includes a plurality of connecting members 220 each having a first aperture 225 that receives the protrusion 130, 145 of each of the first and second portions 125, 140 of the first coupling member 120 and a second aperture 230 that receives the protrusion 180, 195 of each of the first and second portions 175, 190 of the second coupling member 170. The first portion protrusion 130 and the second portion protrusion 145 may be tapered to self align the first aperture 225 of the connecting member 220 with the first and second portion protrusions 130, 145 of the first coupling member 120. The first portion protrusion 180 and the second portion protrusion 195 may be tapered to self align the second aperture 230 of the connecting member 220 with the first and second portion protrusions 180, 195 of the second coupling member 170.

The connecting members 220 are coupled to the first and second coupling members 120, 170 to connect the first left transversely extending beam member 45 to the second left transversely extending beam member 75 and to connect the first right transversely extending beam member 50 to the second right transversely extending beam member 80. The connecting members 220 may be fabricated from a metal, an alloy, aluminum, an aluminum alloy, or other light weight material including carbon fiber, composites, a polymer, a plastic, a filler in a resin matrix, or another suitable material. Aluminum provides some corrosion resistance.

Each boom structure 40 includes a hinge 235. The hinge 235 is coupled to the first and second pair of left and right transversely extending beam members 45, 50, 75, 80 using fasteners 237. The fasteners 237 may be self-tapping fasteners. The hinge 235 couples the boom structure 40 to the mobile agricultural implement 10. The hinge 235 may be fabricated from cast aluminum and extruded aluminum, which provides low manufacturability cost. The hinge 235 may also be fabricated from a metal, an alloy, an aluminum alloy, or other light weight material including carbon fiber, composites, a polymer, a plastic, a filler in a resin matrix, or another suitable material.

Each boom structure 40 includes a first sheet member 240 received by the first sheet member receiving portions 65, 70 of the first pair of left and right transversely extending beam members 45, 50. Each boom structure 40 includes a second sheet member 245 received by the second sheet member receiving portions 95, 100 of the second pair of left and right transversely extending beam members 75, 80. The first and second sheet members (240, 245) may be fabricated from 6061-T6 aluminum, which provides some corrosion resistance. The first and second sheet members (240, 245) may also be fabricated from a metal, an alloy, aluminum, an aluminum alloy, or other light weight material including carbon fiber, composites, a polymer, a plastic, a filler in a resin matrix, or another suitable material.

Advantageously, the boom structure 40 of the disclosure may be assembled without welding or with minimal welding by use of innovative boom assembly joints 37. Reduction of welding in manufacturing of the boom structure 40 reduces skilled labor requirements, energy consumption, and other costs associated with welding, and is well suited for reducing product cost of the boom structure 40. The boom assembly joints 37 facilitate structural integrity of the boom structure 40 by providing sufficient torsional stability for sprayers and other agricultural applications, for example.

Various features are set forth in the following claims.

What is claimed is:

1. A boom structure for a mobile agricultural implement, the boom structure comprising:
   a first pair of left and right transversely extending beam members, each comprising a first protrusion and a first sheet member receiving portion;
   a second pair of left and right transversely extending beam members, each comprising a second protrusion and a second sheet member receiving portion, the second pair of left and right transversely extending beam members spatially offset from the first pair of left and right transversely extending beam members;
   a plurality of first coupling members coupled to the first protrusion of each of the first pair of left and right transversely extending beam members;
   a plurality of second coupling members coupled to the second protrusion of each of the second pair of left and right transversely extending beam members;
   a plurality of connecting members coupled to the first and second coupling members to connect the first left transversely extending beam member to the second left transversely extending beam member and to connect the first right transversely extending beam member to the second right transversely extending beam member;
   a hinge coupled to the first and second pair of left and right transversely extending beam members;

a first sheet member received by the first sheet member receiving portions of the first pair of left and right transversely extending beam members;

a second sheet member received by the second sheet member receiving portions of the second pair of left and right transversely extending beam members; and a tube holder coupled to the second protrusion of both of the second pair of left and right transversely extending beam members.

2. The boom structure of claim 1, further comprising a tube coupled to the tube holder.

3. The boom structure of claim 2, further comprising a nozzle in fluid communication with the tube, the nozzle positioned between the second pair of left and right transversely extending beam members to protect the nozzle from breakage.

4. A boom structure for a mobile agricultural implement, the boom structure comprising:

a first pair of left and right transversely extending beam members, each comprising a first protrusion and a first sheet member receiving portion;

a second pair of left and right transversely extending beam members, each comprising a second protrusion and a second sheet member receiving portion, the second pair of left and right transversely extending beam members spatially offset from the first pair of left and right transversely extending beam members;

a plurality of first coupling members coupled to the first protrusion of each of the first pair of left and right transversely extending beam members;

a plurality of second coupling members coupled to the second protrusion of each of the second pair of left and right transversely extending beam members;

a plurality of connecting members coupled to the first and second coupling members to connect the first left transversely extending beam member to the second left transversely extending beam member and to connect the first right transversely extending beam member to the second right transversely extending beam member;

a hinge coupled to the first and second pair of left and right transversely extending beam members;

a first sheet member received by the first sheet member receiving portions of the first pair of left and right transversely extending beam members; and a second sheet member received by the second sheet member receiving portions of the second pair of left and right transversely extending beam members;

wherein the first and second protrusions are T-shaped and the first and second coupling members each comprise a first portion comprising at least two first portion protrusions and a first groove and a second portion comprising at least two second portion protrusions and a second groove, where the first portion and second portion protrusions are facingly engaged and the first and second grooves receive one of the first and second protrusions.

5. A boom structure for a mobile agricultural implement, the boom structure comprising:

a first pair of left and right transversely extending beam members, each comprising a first protrusion and a first sheet member receiving portion;

a second pair of left and right transversely extending beam members, each comprising a second protrusion and a second sheet member receiving portion, the second pair of left and right transversely extending beam members spatially offset from the first pair of left and right transversely extending beam members;

a plurality of first coupling members coupled to the first protrusion of each of the first pair of left and right transversely extending beam members;

a plurality of second coupling members coupled to the second protrusion of each of the second pair of left and right transversely extending beam members;

a plurality of connecting members coupled to the first and second coupling members to connect the first left transversely extending beam member to the second left transversely extending beam member and to connect the first right transversely extending beam member to the second right transversely extending beam member;

a hinge coupled to the first and second pair of left and right transversely extending beam members;

a first sheet member received by the first sheet member receiving portions of the first pair of left and right transversely extending beam members; and a second sheet member received by the second sheet member receiving portions of the second pair of left and right transversely extending beam members;

wherein the first and second protrusions are T-shaped and the connecting members each comprise a first aperture that receives at least one of the first portion protrusions and at least one of the second portion protrusions of the first coupling member and a second aperture that receives at least one of the first portion protrusions and at least one of the second portion protrusions of the second coupling member.

6. The boom structure of claim 5, wherein the first portion and second portion protrusions of the first coupling member are tapered to self align the first aperture of the connecting member with the first portion and second portion protrusions of the first coupling member.

7. The boom structure of claim 6, wherein the first portion and second portion protrusions of the second coupling member are tapered to self align the second aperture of the connecting member with the first portion and second portion protrusions of the second coupling member.

8. The boom structure of claim 7, further comprising a plurality of rivets to couple the first portion protrusions of the first coupling member to the second portion protrusions of the first coupling member and to couple the first portion protrusions of the second coupling member to the second portion protrusions of the second coupling member.

9. The boom structure of claim 8, further comprising an adhesive to couple the first portion protrusions of the first coupling member to the second portion protrusions of the first coupling member and to couple the first portion protrusions of the second coupling member to the second portion protrusions of the second coupling member.

* * * * *